(12) United States Patent
Son et al.

(10) Patent No.: US 9,310,547 B2
(45) Date of Patent: Apr. 12, 2016

(54) BACKLIGHT ASSEMBLY AND A DISPLAY DEVICE USING THE SAME

(71) Applicant: SAMSUNG DISPLAY CO., LTD., Yongin, Gyeonggi-Do (KR)

(72) Inventors: Young-Ran Son, Seoul (KR); Young-Min Park, Hwaseong-Si (KR); Chang-Moo Lee, Yongin-Si (KR); Seung-Hwa Ha, Osan-Si (KR); Seong-Yong Hwang, Asan-Si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 199 days.

(21) Appl. No.: 13/910,646

(22) Filed: Jun. 5, 2013

(65) Prior Publication Data

US 2014/0185318 A1   Jul. 3, 2014

(30) Foreign Application Priority Data

Jan. 3, 2013   (KR) ..................... 10-2013-0000479

(51) Int. Cl.
*F21V 7/05*    (2006.01)
*G02B 6/42*   (2006.01)
*F21V 8/00*   (2006.01)

(52) U.S. Cl.
CPC ............... *G02B 6/0031* (2013.01); *F21V 7/05* (2013.01); *G02B 6/0028* (2013.01); *G02B 6/0046* (2013.01); *G02B 6/0096* (2013.01)

(58) Field of Classification Search
CPC .... G02B 6/001; G02B 6/0028; G02B 6/0031; G02B 6/0046; G02B 6/0096; F21V 7/048; F21V 7/05

USPC ......... 362/551, 554, 555, 556, 558, 560, 609, 362/610; 40/546

See application file for complete search history.

(56) References Cited

U.S. PATENT DOCUMENTS 3,923,375 A * 12/1975 Bowerman ............. G02B 7/182
                                                                385/36

(Continued)

FOREIGN PATENT DOCUMENTS

KR   10-2009-0072874    7/2009
KR       10-1122001     2/2012

OTHER PUBLICATIONS

English Abstract for Publication No. 10-2009-0072874.

(Continued)

*Primary Examiner* — Alan Cariaso
(74) *Attorney, Agent, or Firm* — F. Chau & Associates, LLC (57) ABSTRACT

A backlight assembly includes a light guide member extending in a direction and having a light incident surface and a light exiting surface. A light source faces the light guide member and supplies light to the light guide member through the light incident surface. A reflecting member reflects light exiting from the light exiting surface of the light guide member. The reflecting member includes a groove receiving the light guide member. A first reflecting portion is disposed under the light guide member and reflects light refracted by the light guide member in an upward direction. A second reflecting portion is disposed on the light guide member and reflects light refracted by the light guide member in a downward direction.

14 Claims, 7 Drawing Sheets

(56) References Cited

U.S. PATENT DOCUMENTS

| | | | |
|---|---|---|---|
| 4,977,487 A * | 12/1990 | Okano | 362/555 |
| 5,228,765 A * | 7/1993 | Jones | 362/551 |
| 5,434,754 A * | 7/1995 | Li et al. | 362/511 |
| 6,095,673 A * | 8/2000 | Goto et al. | 362/582 |
| 6,161,935 A * | 12/2000 | Oyama | 362/609 |
| 6,519,401 B1 * | 2/2003 | Imamura et al. | 385/123 |
| 7,104,678 B2 * | 9/2006 | De Lamberterie | 362/560 |
| 7,300,184 B2 | 11/2007 | Ichikawa et al. | |
| 7,810,977 B2 * | 10/2010 | Ueyama | G02B 6/0028 362/610 |
| 2006/0227547 A1 * | 10/2006 | Tseng | G02B 6/0016 362/231 |
| 2013/0201719 A1 * | 8/2013 | Kuo | G02B 6/0028 362/603 |

OTHER PUBLICATIONS

English Abstract for Publication No. 10-1122001.

* cited by examiner

BACKLIGHT ASSEMBLY AND A DISPLAY DEVICE USING THE SAME

CROSS-REFERENCE TO RELATED APPLICATION

This application claims priority under 35 U.S.C. §119 to Korean Patent Application No. 10-2013-0000479, filed on Jan. 3, 2013, in the Korean Intellectual Property Office (KIPO), the disclosure of which is incorporated by reference herein in its entirety.

TECHNICAL FIELD

Exemplary embodiments of the present invention relate to displays, and more specifically, to a backlight assembly and a display device using the backlight assembly.

DISCUSSION OF THE RELATED ART

A liquid crystal display includes a liquid crystal display panel for displaying images and a backlight assembly for providing light to the liquid crystal display panel.

Backlight assemblies may be classified into a direct-illumination type and an edge-illumination type according to the position of its light sources.

In the edge-illumination type backlight assembly, light sources such as light emitting diodes (LEDs) are positioned at one or more edges of a light guide plate. Light emitted from the light sources are guided to the display panel by the light guide plate. However, use of the light guide plate may cause increases in manufacturing costs and weight of the display.

Conventional edge-illumination type backlight assemblies without a light guide plate may not uniformly supply light to the display panel.

SUMMARY

According to an exemplary embodiment of the present invention, a backlight assembly includes a light guide member. The light guide member has a light incident surface and a light exiting surface. A light source faces the light guide member and supplies light to the light guide member through the light incident surface. A reflecting member reflects light exiting from the light exiting surface of the light guide member.

In an exemplary embodiment of the present invention, the reflecting member may include a groove receiving the light guide member. A first reflecting portion is disposed at a side of the light guide member, e.g., under the light guide member. The first reflecting portion reflects light refracted by the light guide member in a first direction, e.g., in an upward direction. A second reflecting portion is disposed at another side of the light guide member, e.g., over the light guide member. The second reflecting portion reflects light refracted by the light guide member in a second direction, e.g., in a downward direction.

In an exemplary embodiment of the present invention, the reflecting member may further include a third reflecting portion extending from the first reflecting portion.

In an exemplary embodiment of the present invention, the third reflecting portion may extend in an upwardly inclined direction with respect to a horizontal direction such that a height of the third reflecting portion may gradually increase in distance direction away from the light source.

In an exemplary embodiment of the present invention, the reflecting member may further include an optical sheet disposed on the second reflecting portion.

In an exemplary embodiment of the present invention, the light incident surface may include a first light incident surface and a second light incident surface respectively disposed on first and second sides of the light guide member, e.g., two opposite sides of the light guide member. The light source may include a first light source facing the first light incident surface and a second light source facing the second light incident surface.

In an exemplary embodiment of the present invention, the light source may include a light emitting diode.

In an exemplary embodiment of the present invention, the light guide member may have a bar shape.

The light guide member has a cross-sectional shape of a rectangle, a circle, or a semi-circle.

In an exemplary embodiment of the present invention, a vacant space may be formed between the light guide member and the third reflecting portion.

In an exemplary embodiment of the present invention, the light exiting surface of the light guide member may have a curved shape.

In an exemplary embodiment of the present invention, the light exiting surface of the light guide member may have a light exiting pattern.

In an exemplary embodiment of the present invention, the light exiting pattern may have a triangular sectional shape or a circular sectional shape.

In an exemplary embodiment of the present invention, the light guide member may have a reflecting pattern provided on at least a portion of an outer surface of the light guide member contacting with the reflecting member.

According to an exemplary embodiment of the present invention, a display device includes a display panel displaying an image using light. A backlight assembly is disposed under the display panel. The backlight assembly supplies light to the display panel. The backlight assembly includes a light source generating light. A light guide member faces the light source. The light guide member refracts light generated from the light source. A reflecting member receives the light guide member. The reflecting member reflects light refracted from the light guide member.

In an exemplary embodiment of the present invention, the reflecting member may include a groove receiving the light guide member. A first reflecting portion is disposed under the light guide member. The first reflecting portion reflects light refracted by the light guide member in an upward direction. A second reflecting portion is disposed over the light guide member. The second reflecting portion reflects light refracted by the light guide member in a downward direction.

In an exemplary embodiment of the present invention, the reflecting member may further include a third reflecting portion extending from the first reflecting portion.

In an exemplary embodiment of the present invention, the third reflecting portion may extend in an upwardly inclined direction with respect to a horizontal direction such that a height of the third reflecting portion may gradually increase in a direction away from the light source.

In an exemplary embodiment of the present invention, the light guide member may have a bar shape.

According to an exemplary embodiment of the present invention, a backlight assembly includes a light guide member shaped as a bar. The light guide member has two opposite side surfaces and a light exiting surface. A light source is disposed on at least one of the two opposite side surfaces of the light guide member. A light reflecting member includes a first reflecting portion, a second reflecting portion, and a groove formed between the first and second reflecting portions. The light guide member is disposed in the groove such that the light exiting surface is exposed to the outside. Light emitted from the light source is reflected in the light guide member and is exited through the light exiting surface.

BRIEF DESCRIPTION OF THE DRAWINGS

Exemplary embodiments of the present invention can be understood in more detail from the following detailed description when taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. Like reference numerals may designate like or similar elements throughout the specification and the drawings. It will be understood that when an element is referred to as being "on," "connected to," or "coupled to" another element, it can be directly on, connected to or coupled to the other element or intervening elements may be present.

As used herein, the singular forms "a," "an," and "the" are intended to include the plural forms as well, unless the context clearly indicates otherwise.

Figure 1:
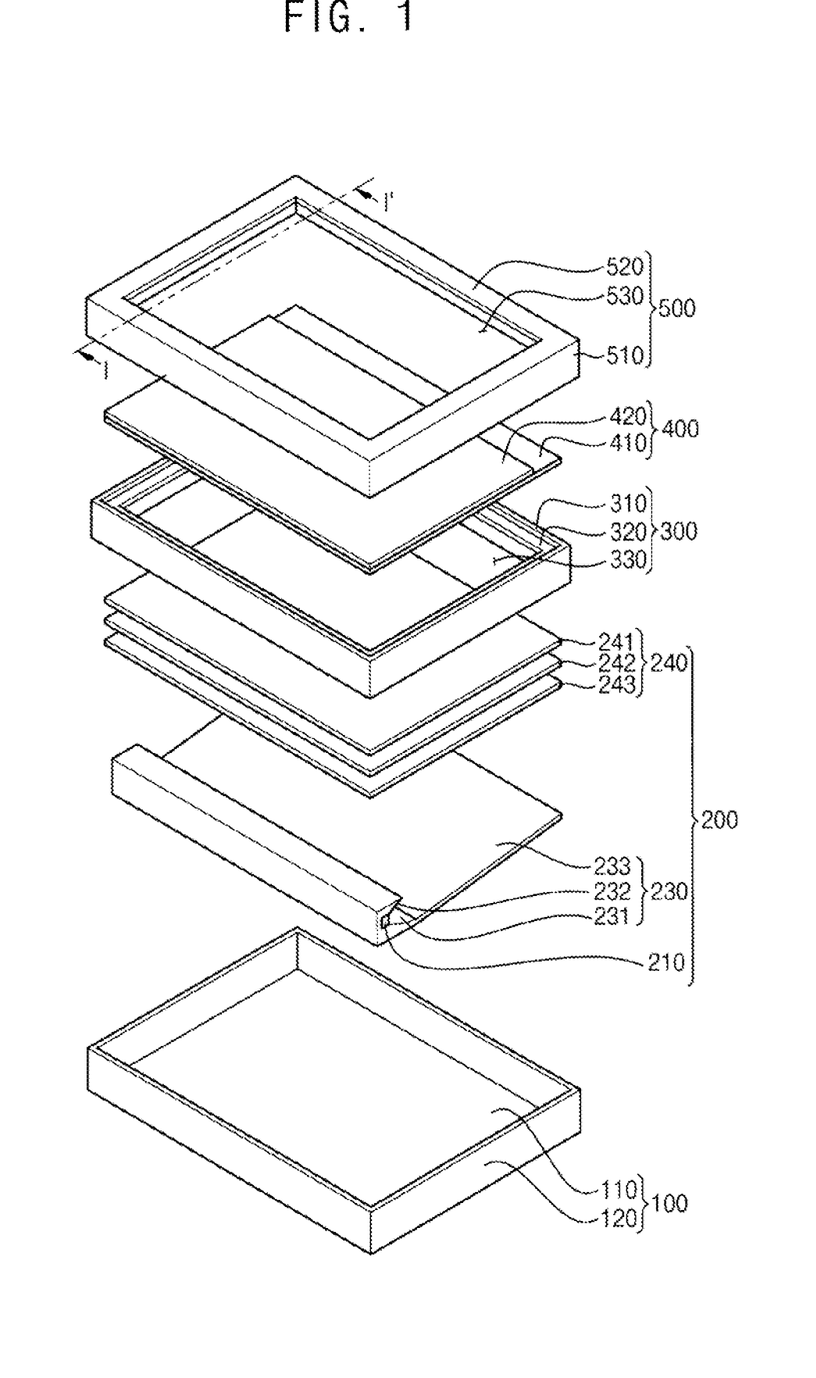
FIG. 1 is an exploded perspective view illustrating a display device according to an exemplary embodiment of the present invention.
Figure 2:
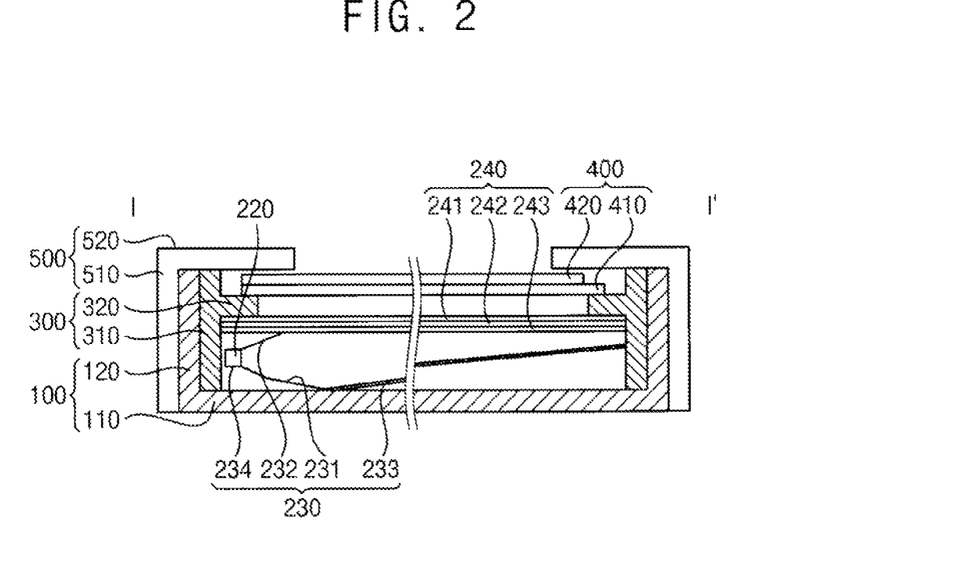
FIG. 2 is a cross-sectional view taken along the line I-I' of FIG. 1.
Figure 3:
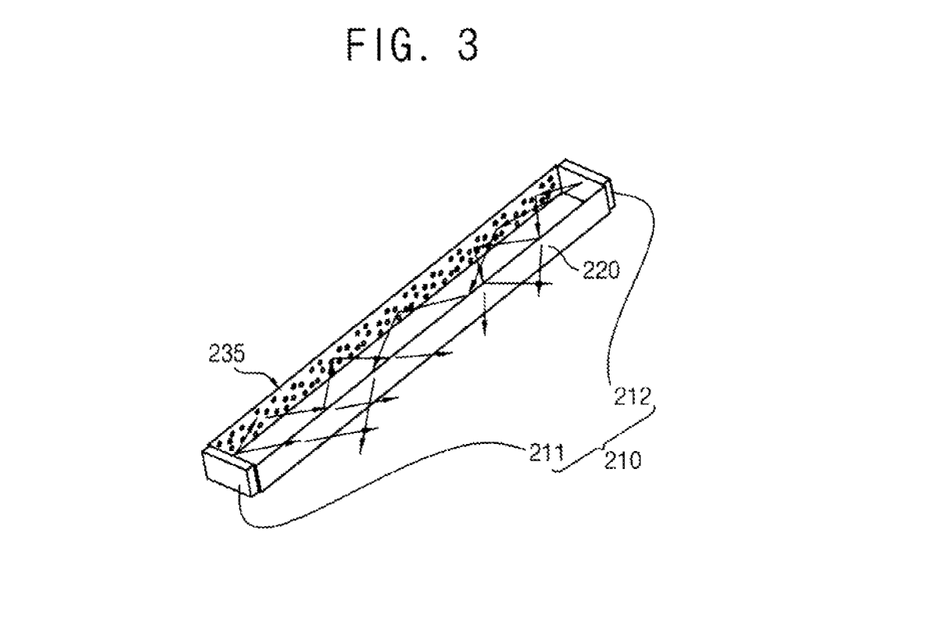
FIG. 3 is a perspective view illustrating a light guide member according to an exemplary embodiment of the present invention.

FIG. 1 is an exploded perspective view illustrating a display device according to an exemplary embodiment of the present invention. FIG. 2 is a cross-sectional view taken along line I-I' of FIG. 1. FIG. 3 is a perspective view illustrating a light guide member according to an exemplary embodiment of the present invention.

Referring to FIGS. 1 to 3, a receiving container 100 includes a bottom plate 110 and a sidewall 120. The sidewall 120 extends upward from the bottom plate 110. The sidewall 120 forms a receiving space together with the bottom plate 110. The receiving container 100 receives a backlight assembly 200, a mold frame 300 and a display panel 400 in the receiving space. As illustrated in FIG. 1, the receiving space has a rectangular shape, but is not limited thereto.

The backlight assembly 200 is received in the receiving container 100. The backlight assembly 200 is disposed under the display panel 400 and provides light to the display panel 400.

The mold frame 300 has a first opening portion 330. The mold frame 300 includes a side portion 310 and an extending portion 320 extending from the side portion 310 toward the first opening portion 330. The extending portion 320 supports the display panel 400. The mold frame 300 is received in the receiving container 100. An optical member 240 is disposed on a lower surface of the extending portion 320. Light emitted from the backlight assembly 200 passes through the first opening portion 330 to the display panel 400.

The display panel 400 includes a first substrate 410 and a second substrate 420 facing the first substrate 410. The first and second substrates 410 and 420 are combined with each other. The display panel 400 displays an image using light provided from the backlight assembly 200.

The cover portion 500 includes a side cover 510 and an upper cover 520. The side cover 510 has a frame shape with a second opening portion 530. The upper cover 520 extends from the side cover 510 toward the second opening portion 530 and partially covers an upper portion of the display panel 400. An image displayed by the display panel 500 is provided through the second opening portion 530.

In an exemplary embodiment of the present invention, the backlight assembly 200 includes a light source 210, a light guide member 220, a reflecting member 230, and an optical member 240. The backlight assembly 200 may further include a third reflecting member 233. The light guide member 220 has an extended bar shape. The light guide member 220 may have a light incident surface and a light exiting surface. For example, the light incident surface may be substantially perpendicular to an extending direction of the light guide member 220, and the light exiting surface may be substantially parallel with the extending direction of the light guide member 220. The light incident surface may include a first light incident surface and a second light incident surface that respectively correspond to two opposite side surfaces of the light guide member 220. The first light incident surface and the second light incident surface may be substantially parallel with each other.

A light source 210 may include a point light source. For example, the light source 210 may include a light emitting diode. The light source 210 may include a first light source 211 facing the first light incident surface and a second light source 212 facing the second light incident surface. In an exemplary embodiment of the present invention, each of the first light source 211 and the second light source 212 may include two light emitting diodes that are positioned on each of two opposite side surfaces of the light guide member 220. For example, the first light source 211 may include two light emitting diodes both of which are positioned at the first light incident surface, and the second light source 212 may include two light emitting diodes both of which are positioned at the second light incident surface.

The light guide member 220 with the light source 210 is received in the reflecting member 230.

The reflecting member 230 includes a groove 234, a first reflecting portion 231 and a second reflecting portion 232. The groove 234 receives the light guide member 220. The first reflecting portion 231 is disposed under the light guide member 220. The first reflecting portion 231 reflects light refracted by the light guide member 220 in an upward direction, e.g., toward the display panel 400. The second reflecting portion 232 is disposed over the light guide member 220. The second reflecting portion 232 reflects light refracted by the light guide member 220 in a downward direction, e.g., toward the third reflecting portion 233. In an exemplary embodiment of the present invention, the second reflecting portion 232 may be shorter than the first reflecting portion 231. However, exemplary embodiments of the present invention are not limited thereto. Alternatively, the second reflecting portion 232 may be longer than the first reflecting portion 231. In an exemplary embodiment of the present invention, the thickness of the first reflecting portion 231 and the second reflecting portion 232 may gradually decrease in a direction away from the light guide member 220.

The reflecting member 230 further includes a third reflecting portion 233 extending in an upwardly inclined direction with respect to a horizontal direction. The height of the third reflecting portion 233 gradually increases in a direction away from the light source 210. The luminance of light emitted from the light source 210 gradually decreases in a direction away from the light source 210. The third reflecting portion 233 extends in an upwardly inclined direction with respect to a horizontal direction such that the height of the third reflecting portion 233 gradually increases in the direction away from the light source 210, and thus, the luminance of light supplied to the display panel 400 may be increased. Therefore, the overall luminance of light from the display panel 400 may be rendered more uniform.

In an exemplary embodiment of the present invention, the first reflecting portion 231, the second reflecting portion 232 and the third reflecting portion 233 may be integrally formed as a single body. For example, the reflecting member 230 may be formed of a metal, such as aluminum, having high light reflectivity. In an exemplary embodiment of the present invention, the reflecting member 230 may be formed by coating a reflecting layer on a macromolecular member.

The optical member 240 is disposed over the first reflecting member 231 and the third reflecting member 233. A vacant space is formed between the optical member 240 and the second reflecting unit 232. For example, no light guide plate is formed between the first reflecting unit 231 and the optical member 240 and between the third reflecting member 233 and the optical member 240, and thus, a vacant space is formed between the first reflecting unit 231 and the optical unit 240 and between the third reflecting member 233 and the optical unit 240. This structure may be referred to as an air guide structure.

The optical member 240 includes a protective sheet 241, a prism sheet 242 and a diffusive sheet 243 to increase quality of light provided to the display panel 400. In an exemplary embodiment of the present invention, the optical member 240 may be one sheet having a function of diffusion and condensation.

Figure 4:
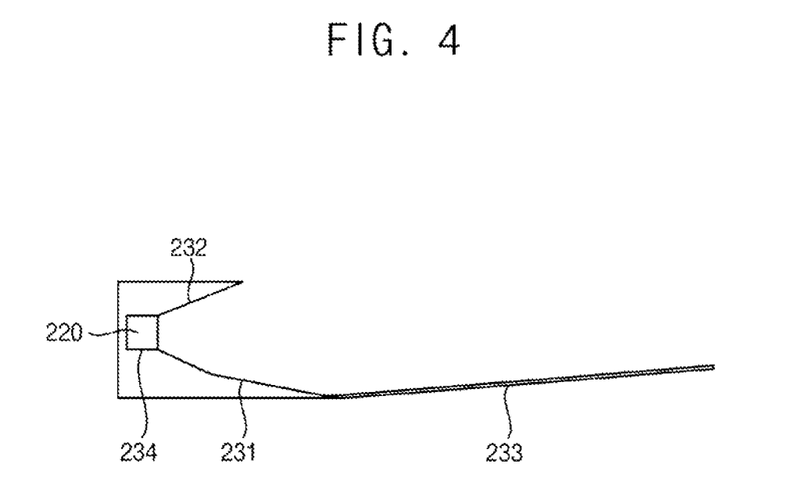
FIG. 4 is a cross-sectional view illustrating a backlight assembly according to an exemplary embodiment of the present invention.

FIG. 4 is a cross-sectional view illustrating a backlight assembly according to an exemplary embodiment of the present invention.

Referring to FIGS. 3 and 4, the light guide member 220 extends in a direction. The light guide member 220 has a light incident surface and a light exiting surface. The light source 210 is disposed on the light guide member 220 and supplies light through the light incident surface to the light guide member 220. The light guide member 220 with the light source 210 is disposed in the groove 234 of the reflecting member 230.

The light guide member 220 has a bar shape. In an exemplary embodiment of the present invention, the light guide member 220 has a rectangular shape in a cross-sectional view. The light guide member 220 may include a transparent material having high light transmissivity. For example, the light guide member 220 may include a transparent material such as polymethylmethacrylate (PMMA).

Alternatively, the light guide member 220 may include a transparent material having high thermal resistance such as polycarbonate (PC).

The light guide member 220 is inserted into the groove 234. Three surfaces of the light guide member 220, for example, top and bottom surfaces of the light guide member 220 and a side surface of the light guide member 220 between the top and bottom surfaces, are not exposed to the outside. The light exiting surface is exposed to the outside. At least one of the three surfaces may include a reflecting pattern 235. Light emitted from the light source 210 is reflected by the reflecting pattern 235 on the surface of the light guide member 220 and is exited through the light exiting surface to the reflecting member 230. Light emitted from the light source 210 may be totally reflected in the light guide member 220. The total reflection may be assisted by the reflecting pattern 235 of the light guide member 220.

Referring to FIG. 3, light beams reflected by the reflecting pattern 235 are represented by arrows. Light emitted from the light source 210 is exited through the light exiting surface of the light guide member 220 as if the light is emitted from a line light source. In other words, the light guide member 220 may turn a point light source into a line light source. Thus, the backlight assembly 200 according to an exemplary embodiment of the present invention may uniformly supply light to the display panel 400.

The reflecting pattern 235 may include a printed pattern, a laser pattern or an ink jet pattern. The reflecting pattern 235 may include a pattern having V-shaped grooves.

Figure 5A:
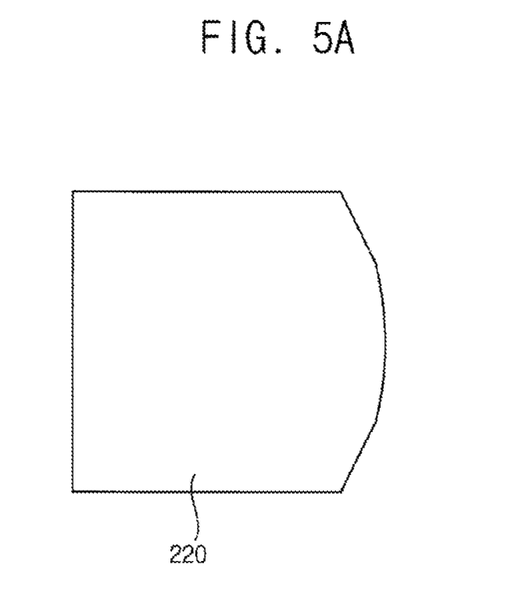
FIGS. 5A, 5B and 5C are cross-sectional views of light guide members according to exemplary embodiments of the present invention.
Figure 5B:
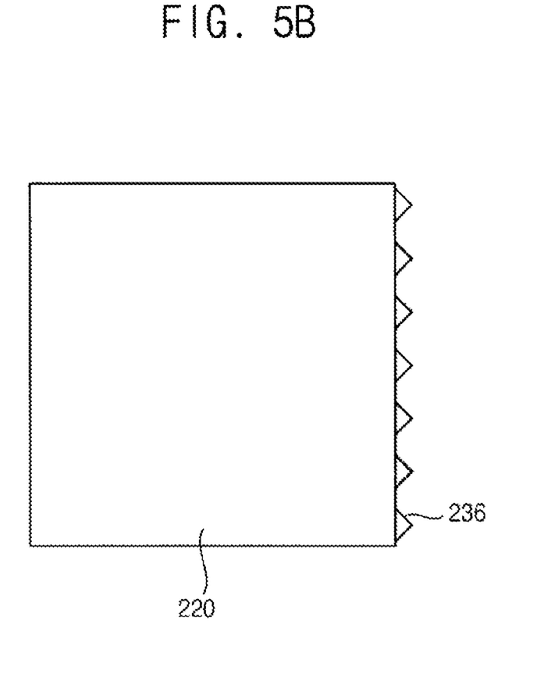
Figure 5C:
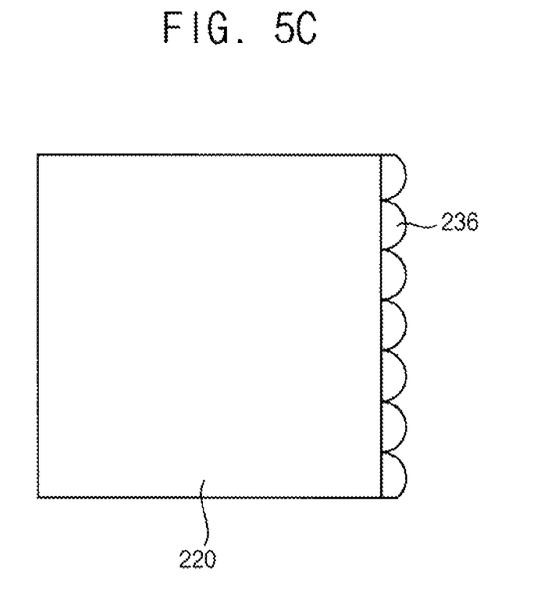

FIGS. 5A, 5B and 5C are cross-sectional views of light guide members having light exiting surfaces different in shape from one another according to exemplary embodiments of the present invention.

Referring to FIGS. 5A, 5B and 5C, the light exiting surface of the light guide member 220 may have various forms.

As illustrated in FIG. 5A, the light exiting surface of the light guide member 220 has a curved shape. The light guide member 220 according to an exemplary embodiment of the present invention is received in the groove 234 of the reflecting member 230. Thus, light emitted from the light guide member 220 may propagate while maintaining a relatively small angle of light beam spread. Therefore, light exiting from the light guide member 220 may have high straightness. The light exiting surface having a curved shape as shown in FIG. 5A may straighten light exiting the light guide member 220. Thus, the light guide member 220 according to an exemplary embodiment of the present invention may uniformly supply light to the display panel 400.

As illustrated in FIG. 5B, the light exiting surface of the light guide member 220 has a plurality of triangular sections. The light guide member 220 according to an exemplary embodiment of the present invention is received in the groove 234 of the reflecting member 230. Thus, light emitted from the light guide member 220 may propagate while maintaining a relatively small angle of light beam spread. Therefore, light exiting from the light guide member 220 may have high straightness. The plurality of triangle sections included in the light exiting surface as shown in FIG. 5B may straighten light exiting the light guide member 220. Thus, the light guide member 220 according to an exemplary embodiment of the present invention may uniformly supply light to the display panel 400.

As illustrated in FIG. 5C, the light exiting surface of the light guide member 220 has a plurality of semi-circular sections. The light guide member 220 according to an exemplary embodiment of the present invention is received in the groove 234 of the reflecting member 230. Thus, light emitted from the light guide member 220 may propagate while maintaining a relatively small angle of light beam spread. Therefore, light exiting from the light guide member 220 may have high straightness. The plurality of semi-circular sections included in the light exiting surface as shown in FIG. 5C may straighten light exiting the light guide member 220. Thus, the light guide member 220 according to an exemplary embodiment of the present invention may uniformly supply light to the display panel 400.

Figure 6A:
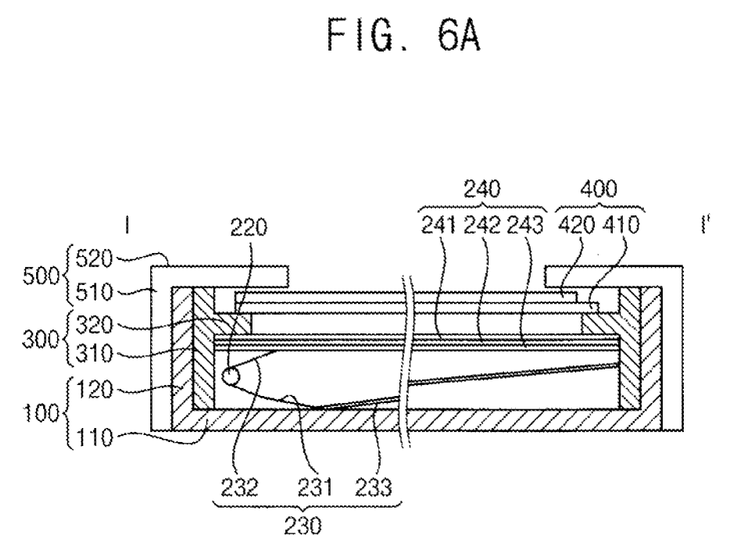
FIGS. 6A and 6B are cross-sectional views illustrating light guide members according to exemplary embodiments of the present invention.
Figure 6B:
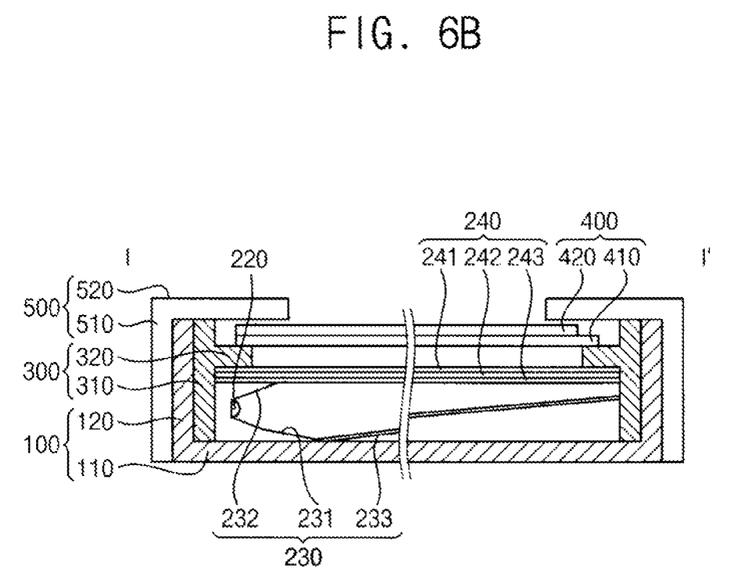

FIGS. 6A and 6B are cross-sectional views illustrating light guide members according to exemplary embodiments of the present invention.

Referring to FIG. 6A, light sources 210 are disposed on two opposite sides, respectively, of a light guide member 220. The light guide member 220 with the light sources 210 is disposed in a groove 234 formed in a reflecting member 230. The light guide member 220 has a bar shape when viewed in a planar fashion and has a circular shape in a cross-sectional view. The light guide member 220 may include a transparent material having high transmissivity. Accordingly, the light guide member 220 may decrease light loss. For example, the light guide member 220 may include a transparent material such as polymethylmethacrylate (PMMA).

Alternatively, the light guide member 220 may include a transparent material having high thermal resistance such as polycarbonate (PC).

The light guide member 220 is inserted into the groove 234. An outer surface of the light guide member 220, except for the light exiting surface, is not exposed to the outside. At least a portion of the outer surface of the light guide member 220 may include a reflecting pattern 235 like that shown in FIG. 3. Light emitted from the light source 210 is reflected by the reflecting pattern 235 on the surface of the light guide member 220 and is exited through the light exiting surface to the reflecting member 230. Light emitted from the light source 210 may be totally reflected in the light guide member 220. The total reflection may be assisted by the reflecting pattern 235 of the light guide member 220. Light emitted from the light source 210 may be exited through the light emitting surface of the light guide member 220 as if the light is emitted from a line light source. In other words, the light guide member 220 may turn a point light source into a line light source. The reflecting pattern 235 may include a printed pattern, a laser pattern or an ink jet pattern. The reflecting pattern 235 may include a pattern having V-shaped grooves.

Referring to FIG. 6B, light sources 210 are disposed on two opposite sides, respectively, of the light guide member 220. The light guide member 220 with the light source 210 is disposed in a groove 234 formed in a reflecting member 230. The light guide member 220 has a bar shape when viewed in a planar fashion and has a semi-circular shape in a cross-sectional view. The light guide member 220 may include a transparent material having high transmissivity. Accordingly, the light guide member 220 may decrease light loss. For example, the light guide member 220 may include a transparent material such as polymethylmethacrylate (PMMA).

Alternatively, the light guide member 220 may include a transparent material having high thermal resistance such as polycarbonate (PC).

The light guide member 220 is inserted into the groove 234. An outer surface of the light guide member 220, except for the light exiting surface, is not exposed to the outside. At least a portion of the outer surface of the light guide member 220 may include a reflecting pattern 235, like that shown in FIG. 3. Light emitted from the light source 210 is reflected by the reflecting pattern 235 on the surface of the light guide member 220 and is exited through the light exiting surface to the reflecting member 230. Light emitted from the light source 210 may be totally reflected in the light guide member 220. The total reflection may be assisted by the reflecting pattern 235 of the light guide member 220. Light emitted from the light source 210 may be exited through the light emitting surface of the light guide member 220 as if the light is emitted from a line light source. In other words, the light guide member 220 may turn a point light source into a line light source. The reflecting pattern 235 may include a printed pattern, a laser pattern or an ink jet pattern. The reflecting pattern 235 may include a pattern having V-shaped grooves.

Figure 7:
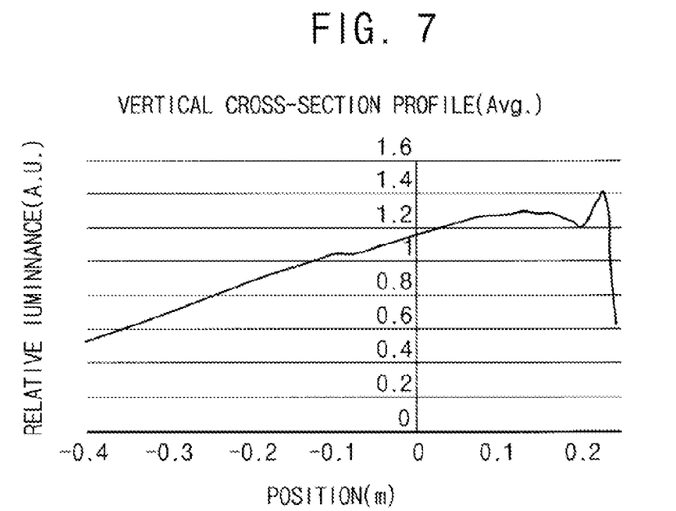
FIG. 7 is a graph of position versus relative luminance of light emitted from a backlight assembly according to an exemplary embodiment of the present invention.

FIG. 7 is a graph illustrating a vertical cross-sectional profile of a display panel according to exemplary embodiment of the present invention.

The light guide member 220 was disposed under the display panel 400 according to an exemplary embodiment of the present invention. Two light emitting diodes were disposed at each of two opposite sides of the light guide member 220. The dimension of each light emitting diode was about 7 mm×about 3 mm. For example, four light emitting diodes were disposed at the light guide member 220, and the four light emitting diodes generated light of about 550 lumen. In the graph, the '0.2 m' represents the position where the light guide member 220 was disposed, and the '0 m' represents the position where the center of the display panel 400 is located.

The graph shows that the light guide member 220 according to an exemplary embodiment of the present invention may uniformly supply light to the display panel 400.

Figure 8:
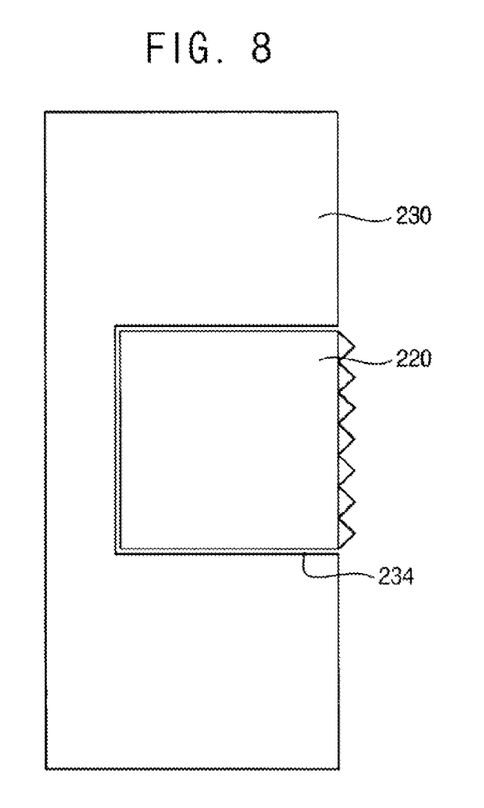
FIG. 8 is a cross-sectional view illustrating a light guide member disposed in a reflecting member according to an exemplary embodiment of the present invention.
Figure 9:
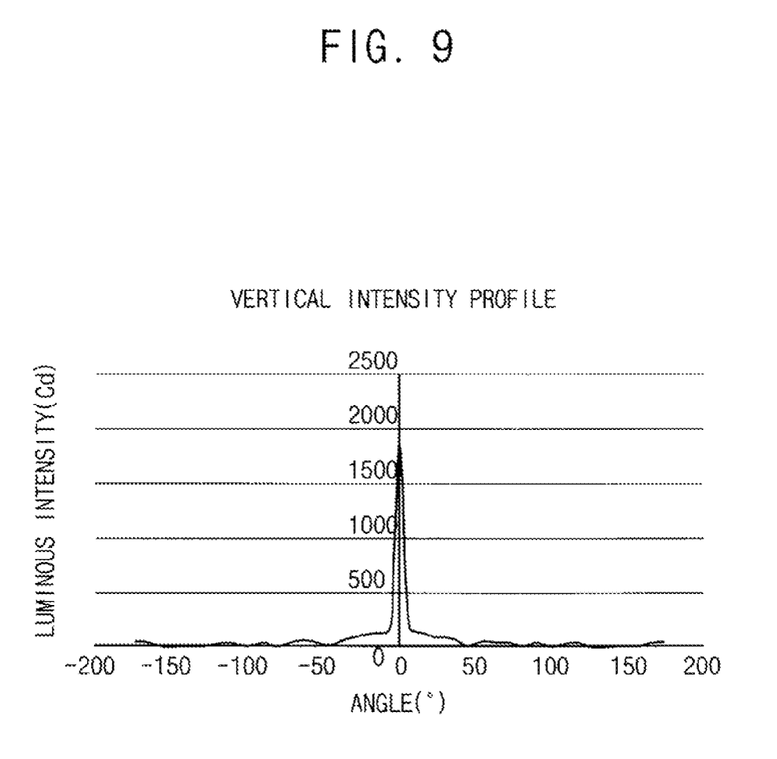
FIG. 9 is a graph of angle versus luminous intensity of light emitted from a light guide member according to an exemplary embodiment of the present invention.

FIG. 8 is a cross-sectional view illustrating a light guide member disposed in a reflecting member according to an exemplary embodiment of the present invention. FIG. 9 is a graph illustrating a vertical intensity profile of a light guide member according to an exemplary embodiment of the present invention.

Referring to FIGS. 8 and 9, a pattern is formed on the light exiting surface of the light guide member 220. The light guide member 220 is disposed in a reflecting member 230. The graph shown in FIG. 9 represents the luminous intensity of light emitted from the light guide member 220 according to an exemplary embodiment of the present invention.

The light guide member 220 according to an exemplary embodiment of the present invention is received in the groove 234 of the reflecting member 230. Therefore, light emitted from the light guide member 220 propagates while maintaining a relatively small angle of light beam spread.

The light exiting surface of the light guide member 220 has a pattern as shown in FIG. 8. The pattern of the light exiting surface may straighten light exiting the light guide member 220. Thus, the light guide member 220 according to an exemplary embodiment of the present invention may uniformly supply light to the display panel 400.

According to an exemplary embodiment of the present invention, a backlight assembly 200, even without a light guide plate, may uniformly supply light to the display panel 400. The light source 210 is disposed on each of two opposite surfaces of the light guide member 220. Accordingly, the number of light emitting diodes used as the light source 210 may be reduced, thus resulting in cost savings.

In addition, the backlight assembly 200 has a reduced angle of light beam spread. Thus, light may be uniformly provided to the display panel 400.

The foregoing is illustrative of exemplary embodiments of the present invention and is not to be construed as limiting thereof. Although a few exemplary embodiments of the present invention have been described, those skilled in the art will readily appreciate that many modifications are possible in the exemplary embodiments without materially departing from the novel teachings of the present invention. Accordingly, all such modifications are intended to be included within the scope of the present invention as defined in the claims.

What is claimed is:

1. A backlight assembly, comprising:
 a light guide member shaped as a bar, wherein the light guide member has two opposite side surfaces and a light exiting surface;
 a light source disposed on at least one of the two opposite side surfaces of the light guide member; and
 a light reflecting member including a first reflecting portion, a second reflecting portion, and a groove formed between the first and second reflecting portions, wherein the light guide member is disposed in the groove such that the light exiting surface is exposed to the outside, and wherein light emitted from the light source is reflected in the light guide member and is exited through the light exiting surface,
 wherein the light guide member contacts with the light reflecting member,
 wherein the first reflecting portion is substantially flat and the second reflecting portion is substantially flat, and
 wherein the first and second reflecting portions spread away from each other in a direction away from the light exiting surface.

2. A display device, comprising:
 a display panel; and
 a backlight assembly supplying light to the display panel, wherein the backlight assembly comprises:
 a light source;
 a light guide member facing the light source and refracting light generated from the light source; and
 a reflecting member receiving the light guide member and reflecting light refracted from the light guide member,
 wherein the light guide member contacts with the reflecting member,
 wherein the reflecting member comprises:
 a groove receiving the light guide member;
 a first reflecting portion disposed at a side of the light guide member and reflecting light refracted by the light guide member in a first direction;
 a second reflecting portion disposed at another side of the light guide member and reflecting light refracted by the light guide member in a second direction; and
 a third reflecting portion extending from the first reflecting portion,
 wherein the third reflecting portion extends in an upwardly inclined direction with respect to a horizontal direction such that a height of the third reflecting portion gradually increases in a direction away from the light source.

3. The display device of claim 2, wherein the light guide member has a bar shape.

4. A backlight assembly, comprising:
 a light guide member having a light incident surface and a light exiting surface;
 a light source facing the light guide member and supplying light to the light guide member through the light incident surface; and
 a reflecting member reflecting light exiting from the light exiting surface of the light guide member, wherein the light guide member is disposed in the reflecting member such that the light exiting surface is exposed to the outside,
 wherein the light guide member contacts with the reflecting member,
 wherein the reflecting member comprises:
 a groove receiving the light guide member;
 a first reflecting portion disposed at a side of the light guide member and reflecting light refracted by the light guide member in a first direction;
 a second reflecting portion disposed at another side of the light guide member and reflecting light refracted by the light guide member in a second direction; and
 a third reflecting portion extending from the first reflecting portion,
 wherein the third reflecting portion extends in an upwardly inclined direction with respect to a horizontal direction such that a height of the third reflecting portion gradually increases in a direction away from the light source.

5. The backlight assembly of claim 4, further comprising an optical sheet disposed on the second reflecting portion.

6. The backlight assembly of claim 4, wherein the light incident surface comprises a first light incident surface and a second light incident surface respectively disposed on first and second sides of the light guide member, and
 wherein the light source comprises:
 a first light source facing the first light incident surface; and
 a second light source facing the second light incident surface.

7. The backlight assembly of claim 4, wherein the light source comprises a light emitting diode.

8. The backlight assembly of claim 4, wherein the light guide member has a bar shape.

9. The backlight assembly of claim 8, wherein the light guide member has a cross-sectional shape of a rectangle, a circle, or a semi-circle.

10. The backlight assembly of claim 8, wherein the light guide member has a reflecting pattern provided on at least a portion of an outer surface of the light guide member contacting the reflecting member.

11. The backlight assembly of claim 4, wherein a vacant space is formed between the light guide member and the third reflecting portion.

12. The backlight assembly of claim 4, wherein the light exiting surface of the light guide member has a curved shape.

13. The backlight assembly of claim 4, wherein the light exiting surface of the light guide member has a light exiting pattern.

14. The backlight assembly of claim 13, wherein the light exiting pattern has a triangular cross-sectional shape or a circular cross-sectional shape.

* * * * *